June 29, 1954 C. W. CLARAS 2,682,578

DEMAGNETIZATION SYSTEM FOR MAGNETIC RECORDER-REPRODUCER

Filed April 9, 1951

Inventor:
Carl W. Claras.
By. Zabel and Gritzbaugh
Attorneys

Patented June 29, 1954

2,682,578

UNITED STATES PATENT OFFICE 2,682,578

DEMAGNETIZATION SYSTEM FOR MAGNETIC RECORDER-REPRODUCER

Carl W. Claras, Chicago, Ill., assignor to Revere Camera Company, Chicago, Ill., a corporation of Delaware Application April 9, 1951, Serial No. 220,023

2 Claims. (Cl. 179—100.2)

Figure 1:
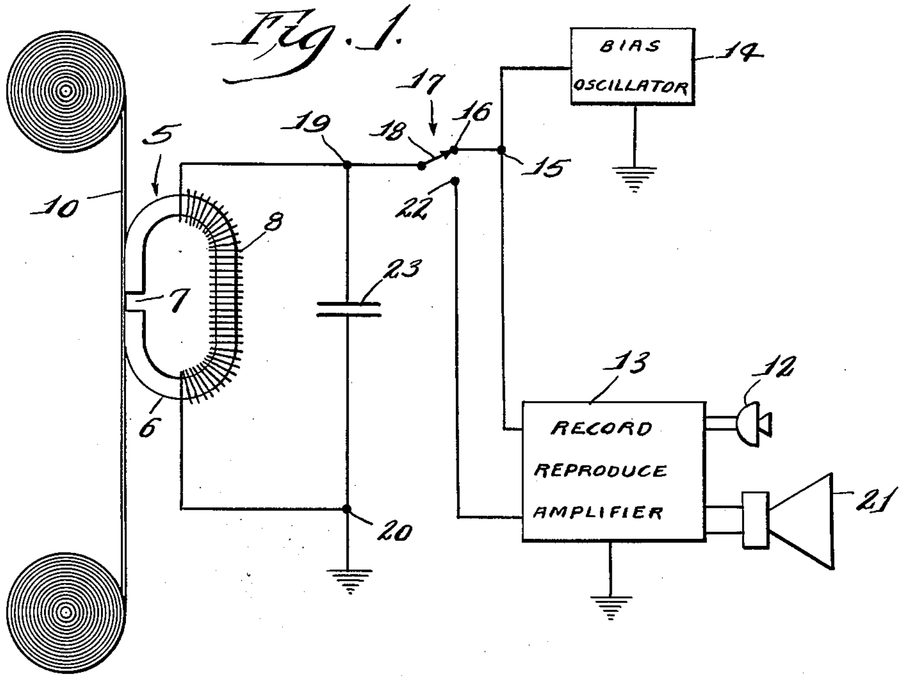

My invention relates to a magnetic recorder-reproducer unit, and more particularly to a system for effecting demagnetization of the head element of the unit after completion of a recording operation. The invention functions to improve to a high degree the signal to noise ratio characteristic of the magnetic recorder-reproducer unit.

Magnetic recorder-reproducer units normally have a single head which functions in recording to impress audio signals upon a magnetic wire or tape, and which functions in reproducing to respond electrically to the magnetization of the wire or tape. The head usually consists of an annular iron core having a short air gap and a coil wound around a portion of the core. When connected for recording operation, the coil of the head normally has applied thereto an A. C. bias current. The function of the bias current is well known and will not be discussed in detail.

At the conclusion of a recording operation, the A. C. bias current must be removed from the head so as to ready the head for reproducing operation. The step of removing this current nearly always produces an objectionable condition of permanent magnetization in the iron core because the current is interrupted, in most cases, when the instantaneous current is not at or near zero value in the coil. In this circumstance the magnetic field produced by the current then in the coil collapses to induce a transient surge of current in the coil. The magnetic field generated by this transient surge is, of course, polarized in one direction, and it is effective to create a residual permanent magnetization in the core. This magnetization is highly objectionable, as will be seen, and it is the purpose of my invention to avoid the creation of this condition of magnetization.

The term "permanent" magnetization as used herein refers to the residual magnetization that usually exists in the core between successive periods of recording operation. During recording the core is properly magnetized by the magnetic fields of the A. C. bias and signal currents.

In the absence of my invention, as just mentioned, the core of the head is given a permanent magnetization when the A. C. bias current is removed from the head at the conclusion of a recording operation. The head then magnetizes the moving magnetic wire or tape in such a manner that objectionable audio noise is produced when the unit is connected for reproducing operation. This audio noise may best be described as a background "hissing" sound, which sound materially reduces the signal to noise ratio of the unit and limits the dynamic range.

The above mentioned magnetizing effect of a permanent magnet on the magnetic wire or tape may be described as follows: The wire or tape may be thought of as being made up of a large number of elemental areas or domains, each domain having an elemental magnet unit. These units differ in magnetic characteristics, that is, some units are smaller and may be magnetized or polarized with a less intense field than can others. The moderate field of the permanent magnet, therefore, polarizes the smaller elemental magnet units, and affects the larger units to a lesser degree. The respective domains, being magnetized in varying amounts, produce corresponding responses in the head, when used in the reproducing operation, as the wire or tape moves in contact with the head. These corresponding responses in the head are amplified, and they appear in the loudspeaker as the aforesaid background noise. This noise can, of course, be entirely eliminated if a means is provided to prevent permanent magnetization in the head core upon removal of the A. C. bias current. My invention prevents this magnetization.

Because the signal strength of the desired audio signals in a magnetic recorder-reproducer is a direct linear function of tape speed, it is seen that the signal to noise ratio is lower at the lower tape speeds, and, consequently, anything that can be done to improve the signal to noise ratio is of particular importance at the lower speeds. My invention, of course, reduces the noise factor and thus improves the signal to noise ratio at all tape speeds, but it is of especial advantage with speeds of 3¾ inches per second or below where the signal strength is low due to the low tape speed. Since it is desirable to use the lower tape speeds, the advantage of my invention is readily apparent.

My demagnetization system, broadly speaking, involves oscillating the aforementioned transient current in a tank circuit wherein the current alternates throughout a decay period during which time the alternations decrease in amplitude until the contained energy is wholly dissipated by the resistance of the circuit. This arrangement insures that the final current through the head coil will be alternating and of practically zero amplitude. Thus there is no appreciable final instantaneous current in the head to produce the previously described objectionable magnetization of the iron core, and thus no hissing audio noise is impressed on the magnetic wire or tape to be picked up, amplified and discharged through the loud speaker as background noise.

Other objects, advantages and details of the invention will be apparent as the description proceeds, reference being had to the accompanying drawings which illustrate possible embodiments of the invention. It is to be understood, of course, that in commercial applications of the invention various details might well vary somewhat from those here shown and described.

Figure 2:
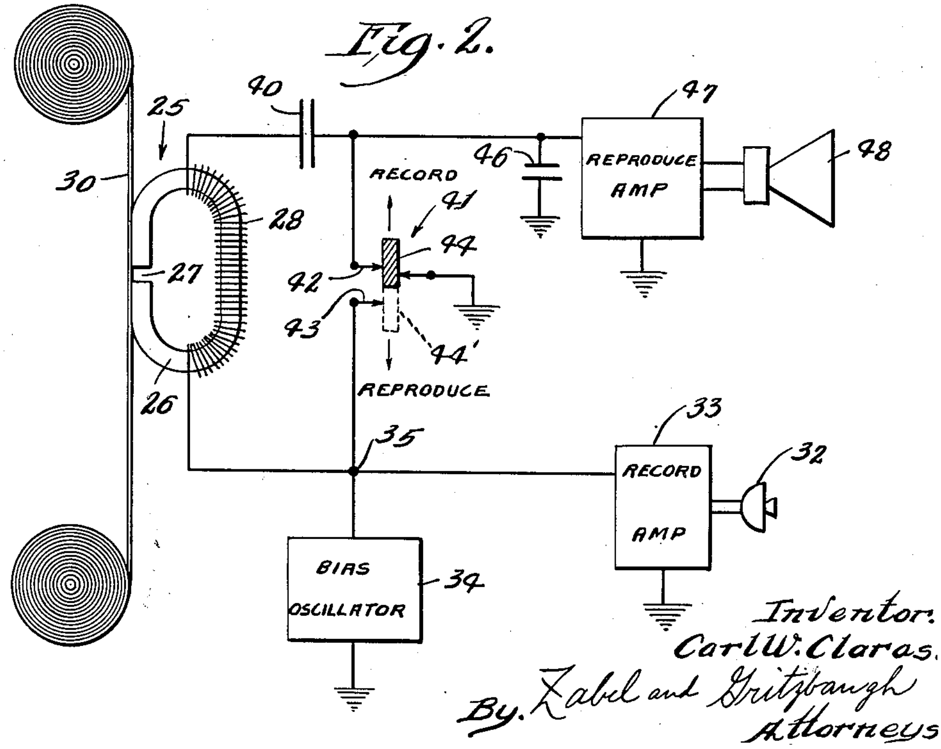

In the drawings:

Fig. 1 illustrates a basic circuit for a magnetic recorder-reproducer embodying my invention, and Fig. 2 illustrates a modified circuit.

Referring now to Fig. 1 of the drawings, the magnetic recorder-reproducer has a single head generally designated by the numeral 5. The head ordinarily comprises an annular iron core 6 having a short air gap 7. A coil 8 surrounds a portion of core 6 and carries the signal current used in recording and reproducing, as well as the A. C. bias current used in recording.

A magnetic wire or tape 10 is arranged to travel in contact with core 6 at air gap 7, and during recording it is magnetized in response to the magnetic field produced by the signal current in coil 8.

The recording channel of the recorder-reproducer includes a microphone or other signal input device 12, an amplifier 13 and a bias oscillator 14. The outputs of the amplifier and oscillator are connected to a common terminal 15, and the latter is connected to one alternative terminal, namely terminal 16, of a single pole double throw switch 17. Movable arm 18 of switch 17 is connected to terminal 19, this terminal being one end of head coil 8. The other end of coil 8, namely terminal 20, is connected to ground.

The reproducing channel of the unit includes a loud-speaker or other audio device 21, amplifier 13 and terminal 22, the latter being the other of the two alternative terminals of switch 17.

My invention adds to the above a capacitance 23 that is connected in parallel with coil 8 between coil terminals 19 and 20. The capacitance and coil constitute a tank circuit that functions when the A. C. bias is removed on completion of a recording operation to dissipate the transient energy contained in coil 8. The value of capacitance 23 is not critical, although it may be chosen to provide a tank circuit that is resonate at the bias frequency.

When switch 17 is positioned as illustrated for recording operation, microphone 12 is connected through amplifier 13 and switch 17 to head 5. Also, bias oscillator 14 is connected through switch 17 to head 5. Thus, both signal current from microphone 12 and bias current from oscillator 14 pass through coil 8, and the magnetic field generated thereby is effective to magnetize wire or tape 10 with the desired audio signals.

Upon completion of a recording operation, arm 18 of switch 17 is moved to its alternative position, namely, it is moved into contact with terminal 22. This, of course, conditions the unit for reproducing or playback operation. It also disconnects the A. C. bias current from head 5. The previously described energy at that instant present in head 5 oscillates in the coil 8-capacitance 23 tank circuit until it is fully dissipated in the resistance of the circuit. Thus, there is no uni-directional final current in coil 8 that is capable of producing the objectionable condition of permanent magnetization in iron core 6. Consequently, the magnetic wire or tape is not magnetized in the manner that gives rise to the background hissing noise on reproducing. The same result is produced if the unit is merely turned off following completion of a recording operation rather than switched into playback.

In Fig. 2 of the drawing I have illustrated a modified circuit for a magnetic recorder-reproducer embodying my invention.

A similar head 25 has a core 26 with an air gap 27 and a coil 28. Magnetic wire or tape is designated by 30.

The recording channel includes a microphone 32, a record amplifier 33 and a bias oscillator 34. The amplifier and oscillator are both connected to terminal 35 of the head coil 28. The other terminal of coil 28 is connected to ground through capacitance 40 and switch 41.

Switch 41, as illustrated, has two alternative open positions in either of which the switch connects one of two elements to ground and a closed position in which the two elements are connected together. These two elements are switch terminals 42 and 43.

A grounded movable member 44 when in the alternative open position illustrated connects switch terminal 42 to ground. Member 44 is adapted to move from the position illustrated to an alternative open position that is indicated by dotted lines 44′, the latter position being effective to connect switch terminal 43 to ground. In moving from one position to the other, movable member 44 closes and establishes a short duration connection between switch terminals 42 and 43, thereby completing a tank circuit consisting of coil 28 and capacitance 40. This intermediate or closed position of member 44 also establishes a connection between bias ocillator 34 and ground, thereby removing the A. C. bias current from head 25.

When the A. C. bias current is removed from head 25, the transient energy present in the head oscillates in the coil 28-capacitance 40 tank circuit so long as movable member 44 maintains a connection between terminals 42 and 43. This may or may not be a sufficient length of time within which to dissipate the energy in the tank circuit.

Because there is a possibility that switch member 44 will reach the alternative position indicated by 44′ (and thus break the coil 28-capacitance 40 tank circuit) before all the energy is dissipated, I provide an additional capacitance 46 connected between ground and the juncture of capacitance 40 and switch terminal 42. Capacitance 46 functions with coil 28 to establish a second or auxiliary tank circuit to continue the dissipating operation after movable member 44 has broken contact with terminal 42, thus to insure full dissipation of all the energy in head 25.

To complete the description of Fig. 2, the reproducing channel of the unit is established when movable member 44 of switch 41 is moved to the alternative position indicated by dotted lines 44′. The circuit extends from ground through switch 41, switch terminal 43, coil terminal 35, coil 28, capacitance 40 and reproduce amplifier 47 to loudspeaker or other audio device 48.

It will be apparent from the description of the Fig. 2 modification that the two tank circuits function to fully dissipate the transient energy present in head 25 when the A. C. bias is removed.

My invention as above described fully demagnetizes the iron core of the head and thus eliminates completely the background hiss or noise that otherwise results from permanently magnetizing the core upon removal of the A. C. bias current. Consequently, a magnetic recorder-reproducer using my invention will have an increased signal to noise ratio, or, in other words, it will have a higher dynamic range in the output than otherwise. As mentioned, the improvement is of particular importance at the lower wire or tape speeds, but significant improvement is experienced at all speeds.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. In a magnetic recorder-reproducer having a head including a coil to which is applied an A. C. bias current during recording operation, the combination therewith of means for demagnetizing the head following removal therefrom of the applied A. C. bias current, said means including the coil of said head and a first capacitance and switch connected in series with said coil, said switch having three switch terminals and a movable member connected in all positions to one of said terminals, said one terminal being grounded, the first remaining terminal being connected to one side of said coil, the other side of said coil being connected to one side of said capacitance, the second remaining terminal being connected to the other side of said capacitance, said switch movable member having (1) one open switch position whereby said second remaining terminal is connected to said grounded terminal, (2) an alternative open switch position whereby said first remaining terminal is connected to said grounded terminal and (3) a closed switch position whereby said first and second remaining terminals are connected together to establish a tank circuit, and a second capacitance connected between ground and the juncture of said first capacitance and said second remaining terminal to establish a second tank circuit with said coil.

2. In a magnetic recorder-reproducer having a head including a coil to which is applied an A. C. bias current during recording operation, the combination therewith of means for demagnetizing the head following removal therefrom of the applied A. C. bias current, said means including the coil of said head and a first capacitance and switch connected in series with said coil, said switch having three switch terminals and a movable member connected in all positions to one of said terminals, said one terminal being grounded, the first remaining terminal being connected to one side of said coil, the other side of said coil being connected to one side of said capacitance, the second remaining terminal being connected to the other side of said capacitance, said switch movable member having (1) one open switch position whereby said second remaining terminal is connected to said grounded terminal, (2) an alternative open switch position whereby said first remaining terminal is connected to said grounded terminal and (3) a closed switch position whereby said first and second remaining terminals are connected together to establish a tank circuit.

References Cited in the file of this patent

UNITED STATES PATENTS

| Number | Name | Date |
|---|---|---|
| 2,336,886 | Peterson | Dec. 14, 1943 |
| 2,531,141 | Lootens | Nov. 21,1950 |
| 2,538,893 | Begun | Jan. 23, 1951 |
| 2,567,582 | Spears | Sept. 11, 1951 |
| 2,604,548 | Begun | July 22, 1952 |

FOREIGN PATENTS

| Number | Country | Date |
|---|---|---|
| 97,306 | Sweden | Nov. 7, 1939 |